(12) United States Patent
Diessner et al.

(10) Patent No.: US 11,267,511 B2
(45) Date of Patent: Mar. 8, 2022

(54) TRAILER REVERSE ASSIST SYSTEM WITH TRAILER RECOGNITION

(71) Applicant: Continental Automotive Systems, Inc., Auburn Hills, MI (US)

(72) Inventors: Daniel Diessner, Rochester Hills, MI (US); Brandon Herzog, Waterford, MI (US); Alexandru Mihu, Rochester, MI (US)

(73) Assignee: Continental Advanced Lidar Solutions US, Inc., Auburn Hills, MI (US)

( * ) Notice: Subject to any disclaimer, the term of this patent is extended or adjusted under 35 U.S.C. 154(b) by 0 days.

(21) Appl. No.: 16/701,909

(22) Filed: Dec. 3, 2019

(65) Prior Publication Data

US 2021/0163067 A1 Jun. 3, 2021

(51) Int. Cl.
*B62D 15/02* (2006.01)
*B60R 1/00* (2022.01)
*G06K 9/62* (2022.01)
*G06K 9/00* (2022.01)
*B62D 13/00* (2006.01)

(52) U.S. Cl.
CPC ............ *B62D 15/028* (2013.01); *B60R 1/002* (2013.01); *B62D 13/00* (2013.01); *B62D 15/029* (2013.01); *G06K 9/00791* (2013.01); *G06K 9/6256* (2013.01)

(58) Field of Classification Search
CPC .......................... B62D 15/028; G06K 9/00791
See application file for complete search history.

(56) References Cited

U.S. PATENT DOCUMENTS

| | | | |
|---|---|---|---|
| 2007/0152424 A1* | 7/2007 | Deng | B62D 53/005 280/432 |
| 2014/0343793 A1* | 11/2014 | Lavoie | B60W 10/18 701/41 |
| 2019/0359134 A1* | 11/2019 | Yamamoto | B62D 15/021 |
| 2020/0164803 A1* | 5/2020 | Jales Costa | G06T 3/4046 |

* cited by examiner

*Primary Examiner* — Jerry T Jean Baptiste

(57) ABSTRACT

A trailer reverse assist (TRA) system for a tow vehicle aids in reversing an attached trailer. The TRA system includes a processor circuit; at least one camera to obtain images of the trailer; and vehicle dynamic sensors to obtain vehicle dynamics data from the vehicle. The processor circuit, while the TRA system is in a standby, non-active state and while the vehicle is in Drive and traveling forward at a speed above a threshold speed: learns parameters and/or image features of an attached trailer based on data from the at least one camera and the vehicle dynamic sensors; causes the learned parameters and/or image features of the attached trailer to be stored in a database; and informs the driver via the infotainment system that the TRA system can be activated.

16 Claims, 3 Drawing Sheets

TRAILER REVERSE ASSIST SYSTEM WITH TRAILER RECOGNITION

FIELD

The invention relates to vehicle Trailer Reverse Assist (TRA) systems and, more particularly, to a TRA system that estimates parameters related to a trailer, that are required for trailer control.

BACKGROUND

Reversing a vehicle with a connected trailer is a nontrivial and counter intuitive process which often frustrates consumers and poses challenges while attempting to maneuver trailers into tight spots. Drivers are often confused as to which way to turn the vehicle's steering wheel to get the desired change in direction of the trailer. The recent addition of Trailer Reverse Assist (TRA) systems remedies this situation by allowing the driver/operator to steer the trailer directly with the vehicle while backing by turning a knob while viewing a rearview camera image. However, with the conventional TRA systems, the trailer needs to be calibrated with respect to the tow vehicle each time the trailer is hitched to the tow vehicle.

Thus, there is a need to provide a TRA system and method that learns parameters and/or image features of a trailer connected to a tow vehicle so that the learned parameters and/or image features can be used at a future time to re-identify the trailer.

SUMMARY

An object of the invention is to fulfill the need referred to above. In accordance with the principles of a present embodiment, this objective is achieved by a method of learning trailer parameters and/or image features of a trailer attached to a towing vehicle. The vehicle has a trailer reverse assist (TRA) system including at least one camera constructed and arranged to obtain images of the trailer. The TRA system is electrically connected with vehicle dynamic sensors to receive vehicle dynamics data from the vehicle. The TRA system is electrically connected with a display of the vehicle. The method defines a standby state of the TRA system as an inoperable state allowing the display and the at least one camera to operate independently of the TRA system. While in the standby state, the TRA system determines whether certain vehicle operating conditions are met by evaluating the vehicle dynamics data. When the certain operating conditions are met, the TRA system process an image from the at least one camera to determine if a trailer is attached to the tow vehicle. When a trailer is determined to be attached to the tow vehicle, the TRA system determines whether parameters and/or image features of the attached trailer were learned previously. If the parameters and/or image features of the attached trailer were learned previously, the TRA system identifies the attached trailer as a known trailer, and informs the driver that the TRA system can be activated. If the parameters and/or features of the attached trailer were not learned previously, the TRA system learns parameters and/or image features of the attached trailer, identifies the learned attached trailer as a new trailer, and informs the driver that the TRA system can be activated.

In accordance with another aspect of an embodiment, a trailer reverse assist (TRA) system is provided for a tow vehicle to aid in reversing an attached trailer. The TRA system includes a processor circuit; at least one camera constructed and arranged to obtain images of the trailer; and vehicle dynamic sensors constructed and arranged to obtain vehicle dynamics data from the vehicle. The processor circuit is constructed and arranged, while the TRA system is in a standby, non-active state and while the vehicle is in Drive and traveling forward at a speed above a threshold speed, to: learn parameters and/or image features of an attached trailer based on data from the at least one camera and the vehicle dynamic sensors; cause the learned parameters and/or image features of the attached trailer to be stored in a database; and inform the driver that the TRA system can be activated. The processor circuit is constructed and arranged, while the TRA system is in an active state and while the vehicle is in Reverse, to: determine if stored parameters and/or image features of the attached trailer are available and if so, initiate the TRA system with the stored parameters and/or image features data of the attached trailer; and control the TRA system to aid in reversing the vehicle with the attached trailer.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
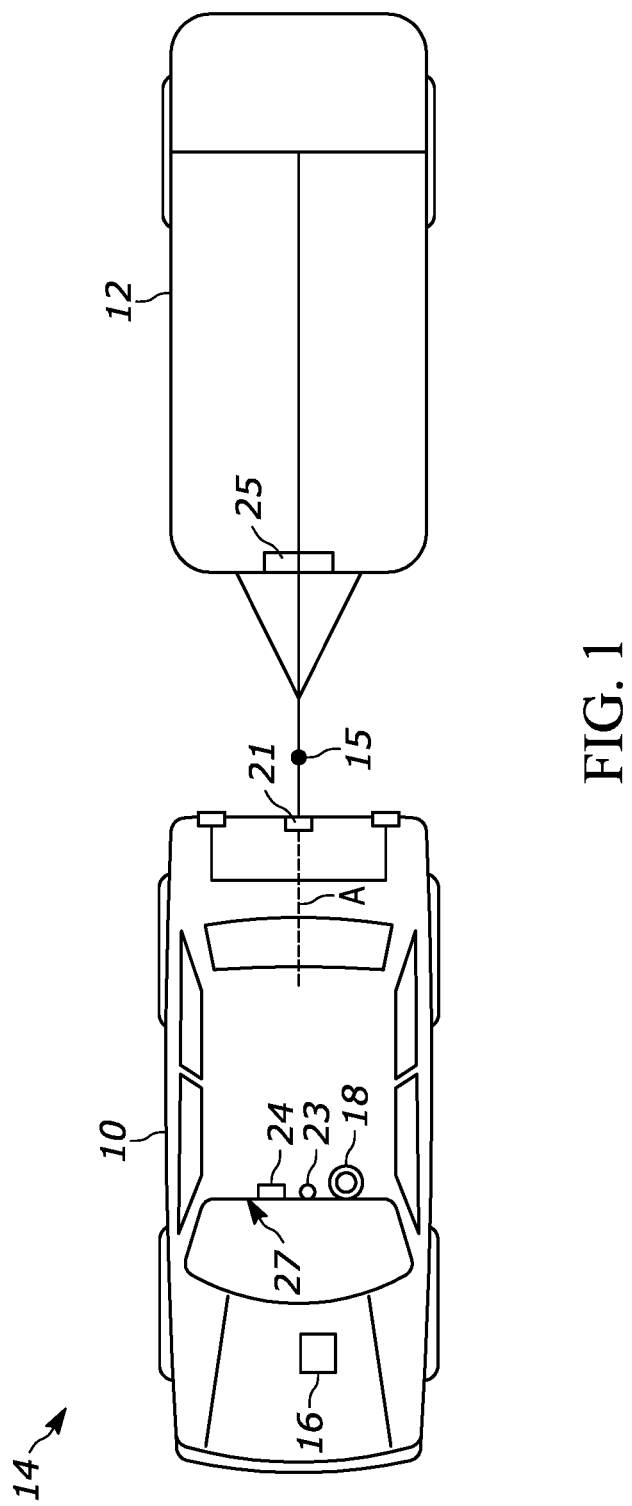
FIG. 1 is a view of a trailer reverse assist system of a tow vehicle of an embodiment, with the tow vehicle shown coupled to a trailer.
Figure 2:
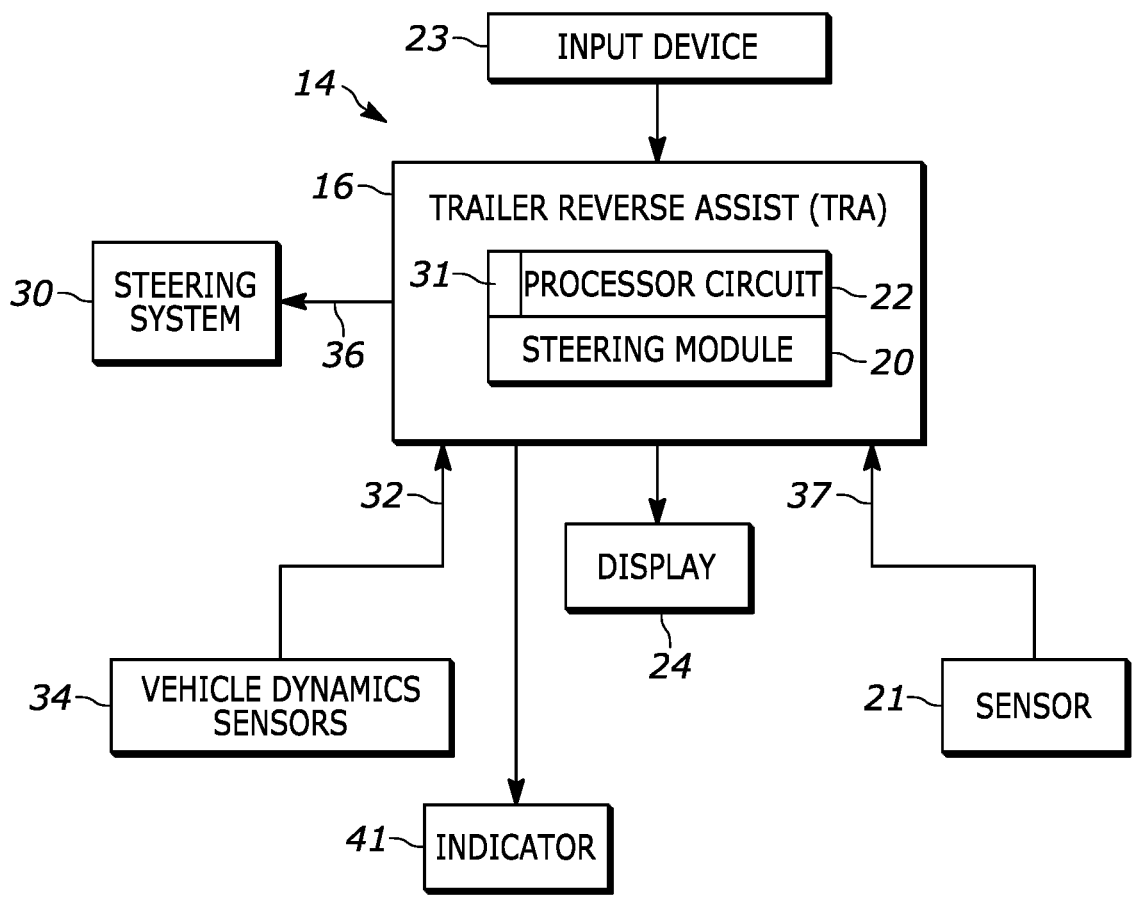
FIG. 2 is a block diagram of the TRA system of the vehicle of FIG. 1.

With reference to FIG. 1, a Trailer Reverse Assist (TRA) system is shown, generally indicated at 14, for assisting a vehicle 10 in backing up of a trailer 12 coupled thereto via coupler or hitch 15. The vehicle 10 includes a Trailer Reverse Assist (TRA) system 16, preferably of the type disclosed in U.S. Pat. No. 9,248,858 B2, the contents of which is hereby incorporated by reference into this specification. As best shown in FIG. 2, the TRA system 16 is an electronic control unit (ECU) including or connected with a separate vehicle steering module 20. In the embodiment, the steering wheel module 20 is shown to be part of the TRA system 16. A coupler angle detection sensor 21, an input device 23, and a display 24 are connected to the TRA system 16. The sensor 21, input device 23 and display 24 may already be existing components and incorporated into the vehicle 10. For example, the input device 23 may be a knob with a push button or joystick controller that is used with an infotainment/camera system 27, with the display 24 being part of the infotainment/camera system 27.

The sensor 21 may be used to measure the coupler or hitch angle which represents relative angle between the vehicle 10 and the trailer 12. The sensor 21 may be one or multiple sensors measuring relative distance between the vehicle 10 and the trailer 12 and using the varied distance to calculate hitch angle. The sensor(s) 21 may use horizontal or vertical features or surfaces on the trailer 12 in the distance measurement. In the embodiment, the sensor 21 is at least one camera, preferably a camera which is already installed in the vehicle 10, such as a back-up camera. The camera 21 may capture an image and image analysis may be used to calculate the hitch angle. A distinct marking 25 can be established on the trailer 12 and captured by the camera 21 for identifying a specific trailer and obtaining information such as dimensions, trailer type, etc. from a database of the TRA system 16.

The TRA system 16 includes a steering module 20 that is constructed and arranged to actively change a steering angle of the front axle wheels of the vehicle 10) via a steering system 30 without the vehicle driver giving a respective input through the vehicle steering wheel 18. When reversing the attached trailer, the driver may manually input a steering command for the vehicle 10 via the input device 23 or, reversing of the vehicle 10 can be performed autonomously when the steering module 20 causes the steering system 30 to change the steering angle via an actuator (not shown) coupled with the steering system 30 so that the vehicle follows a planned path.

The TRA system also includes a processor circuit 22 and a memory circuit 30. With reference FIG. 2, based on signals 32 obtained from conventional vehicle dynamic sensors 34 (e.g., wheel rotations, and/or distance traveled and steering wheel angle, vehicle speed, vehicle yaw angle, and yaw rate), a user requested steering signal 35 from the input device 23 and an observed trailer orientation signal 37 obtained from the camera or sensor 21, in an active state of the TRA system 16, the processor circuit 22 computes corrective actions to be taken and initiates, via steering system input signal 36, the steering system 30 in order to maneuver the vehicle 10 and trailer 12 accordingly.

In accordance with an embodiment, the TRA system 16 is configured to learn parameters and/or image features of the trailer 12 connected to the tow vehicle 10. The learned parameters and image features are used at a future time in order to re-identify the trailer 12, perform the trailer reverse assist function, and present information to the driver supporting the trailer reverse assist function. The embodiment allows a learning process in the background, without requiring driver interaction.

Figure 3:
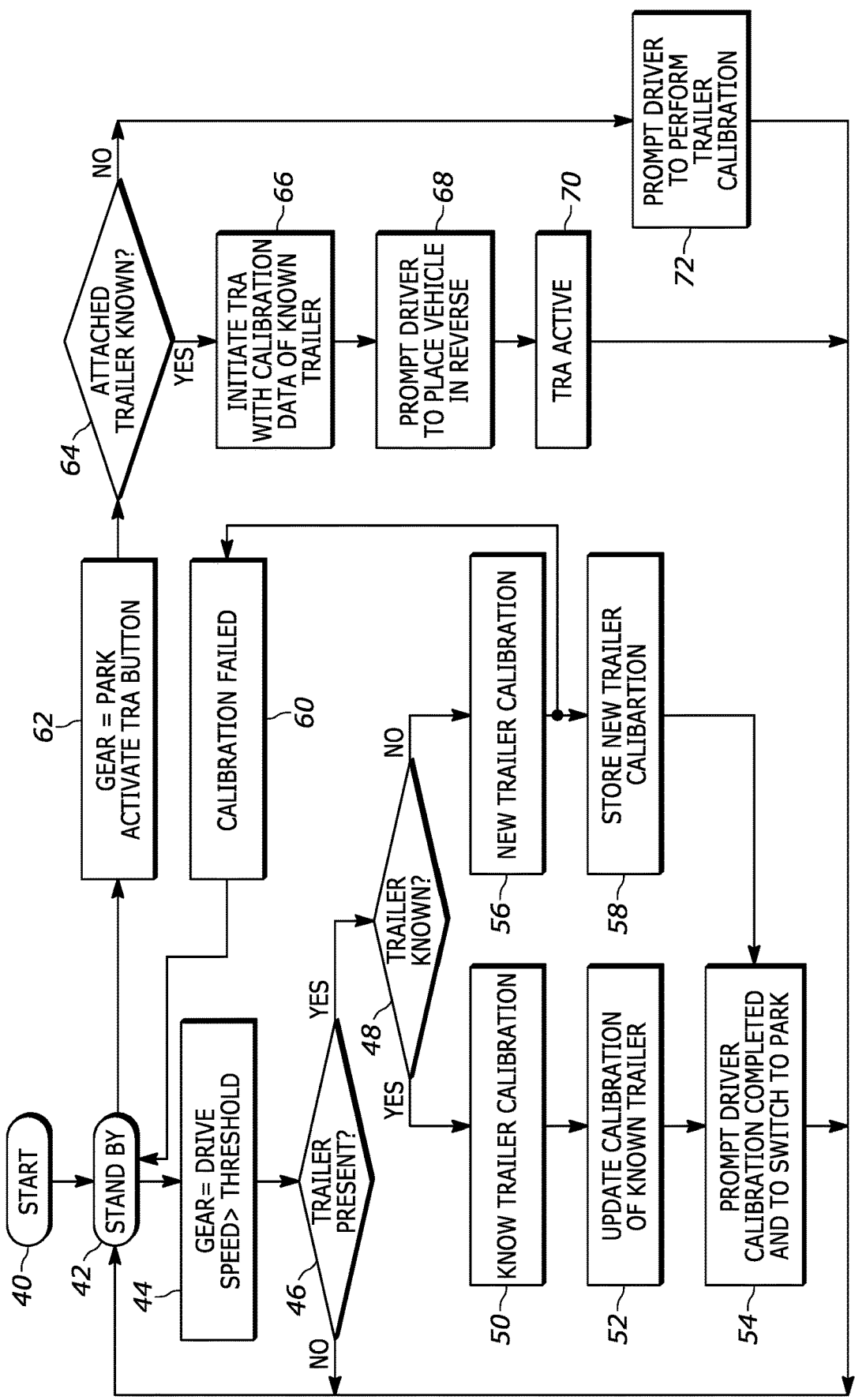
FIG. 3 is a flowchart of method steps performed by the TRA system of FIG. 2.

With reference to FIG. 3, a state diagram defines states of operation of the TRA system 16 that cycles though different system states. In step 40, the vehicle is started with the ignition turned on. At this stage, the trailer 12 connected to the vehicle 10 is assumed uncalibrated. The TRA standby state 42 is in a state of inactivity allowing the vehicle infotainment/camera system 27 to operate independently of the TRA system 16. This state 42 can allow, for example, a bird's eye view to be shown to the driver or a reverse camera image shown to the driver on display 24.

The TRA system 16 evaluates in the standby state 42 if certain conditions are met, allowing the TRA system 16 to learn trailer information. Such conditions, obtained by the vehicle dynamics sensors 24 may be that the transmission is in Drive and the vehicle 10 is driving in forward direction with a speed greater than a threshold (step 44). During these conditions, there is normally no camera image content from camera 21 shown to the driver on the display 24, allowing the camera image to be routed to the TRA system 16 for further processing.

When the above mentioned conditions are met, in step 46, the TRA system 16 processes the image obtained by camera 21 in order to detect if a trailer 12 present and attached to the vehicle 10. If no trailer is attached to the vehicle, no further action takes place and the process returns to the standby state 42. When a trailer 12 is present and attached to the vehicle 10, the TRA system 16, in step 48, detects if the trailer parameters and/or image features for the currently attached trailer were learned previously. This can be achieved by comparing currently obtained trailer parameters and/or features with those stored in the database of memory circuit 31.

If the trailer parameters and/or trailer features were learned previously, in step 50, the trailer is a known trailer and in step 52, the known trailer calibration can optionally be updated in the memory circuit 31. In step 54, the driver is informed using a telltale or HMI message on the infotainment system 27, or by the use of on and indicator 41 such as indicator lights, a message on the instrument cluster, or a sound such as a chime, that the calibration is complete and that the TRA system 16 can now be activated to reverse the coupled trailer 12. The driver is also informed to put the vehicle in Park. The TRA system 16 continues to learn and improve/refine the trailer parameters and/or image features of the trailer 12. The learning process takes place until the certain conditions in step 44 are no longer met, for example, when the vehicle 10 stops moving or the vehicle transmission is placed in Park.

If the trailer parameters and/or trailer features were not learned previously, the TRA system 16 determines that the trailer 12 is a new trailer. In step 56, the TRA system 16 then learns the trailer parameters and/or image features of the new trailer 12. When the learning process is complete, in step 58, the learned trailer parameters and/or image features are stored in a database of the memory circuit 31 and, in step 54, the driver is informed using a telltale or HMI message on the infotainment system 27 or by the indicator 41 that the calibration of the new trailer is complete and the TRA system 16 can now be activated to reverse the coupled trailer 12. The driver is also informed to put the vehicle in Park. The learning process will take place or continue until the certain conditions in step 44 are no longer met, for example, when the vehicle stops moving or the vehicle transmission is placed in Park.

If a calibration fails (step 60), the process returns to the standby state 42. Regarding a failed calibration, the TRA system 16 also monitors that the trailer parameters and/or image features are learned during a reasonable time or reasonable distance travelled. The TRA system 16 therefore detects a condition which prevents the TRA system 16 from learning enough trailer information that is required for the TRA function (failed calibration). In case the driver requests the TRA system 16 to activate in the standby state (for example by pushing a TRA activation button of input device 23) and the TRA system 16 detected the condition which prevented the TRA from learning enough trailer information, the TRA system 16 informs the driver of this condition using a HMI message. The TRA system 16 may inform the driver of counter measures, for example cleaning the camera or attaching a high contrast sticker to the trailer.

When the driver requests the TRA system 16 to activate in the standby state (for example, by pushing the TRA activation button) and not enough trailer parameters and/or image features are available, the TRA system 16 informs the driver that the attached trailer needs to be calibrated or learned. The HMI message may include a description of the necessary process in order to learn or calibrate the trailer, for example driving in forward direction until the trailer parameters and/or image features are learned.

All learning of trailer parameters and/or trailer features takes place when the vehicle is driving in forward direction without any driver interaction. Once enough trailer information about the trailer is available, the driver is informed that the TRA system 16 is ready for activation. The trailer information can originate from memory circuit 31 and relate to a previous learning sequence or is learned in the current sequence.

In step 62, with the vehicle 10 in Park and when the driver requests the TRA system 16 to activate in the standby state (for example by pushing the TRA activation button), the TRA system 16 determines in step 64 if the trailer is known. If so, the trailer parameters and/or trailer 12 features are available for the attached trailer and in step 66, the TRA system 16 initializes using the trailer parameters and/or trailer features of the attached known trailer. The TRA system 16, in step 68 will then prompt the driver to place the vehicle in Reverse. Thereafter, in step 70, the TRA system 16 will activate and provide the requested assistance in order to reverse the trailer 12 by controlling the vehicle's steering system 30 to move the vehicle laterally and optionally longitudinally. If step 64 determined that the attached trailer is not known, in step 72, the driver is prompted to perform a trailer calibration. The TRA system 16 may inform the driver that the TRA system 16 is now active using an HMI message in form of a text message or any other interaction to the driver such as a telltale.

During TRA trailer reversing operation, the TRA system 16 may generate additional HMI information in the form of messages, telltales or graphic overlays in the camera image on display 24. This HMI information supports the driver in the process of reversing the trailer by for example indicating the trailer path. The trailer path may be indicated using a line imposed in the camera image. The origin, length, width and color of the line may be adjustable. The line may be transparent or solid.

In the embodiment, the parameters and/or image features include all information necessary for TRA function, including, for example, an image of the trailer, a marking 25 on the trailer, type of trailer, and trailer wheel base length. Thus, the TRA system 16 of the embodiment learns trailer information and thus does not require a recalibration for a trailer that is known by the system.

The operations and algorithms described herein can be implemented as executable code within the processor circuit 22 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit 22 including a reserved portion of processor memory for storage of application state data and application variables that are modified by execution of the executable code by a processor circuit. The memory circuit 31 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of learning trailer parameters and/or image features of a trailer attached to a towing vehicle, the vehicle having a trailer reverse assist (TRA) system including at least one camera constructed and arranged to obtain images of the trailer, the TRA system being electrically connected with a vehicle dynamic sensors to receive vehicle dynamics data from the vehicle, the TRA system being electrically connected with a display, the method comprising the steps of:

defining a standby state of the TRA system as an inoperable state allowing the display and the at least one camera to operate independently of the TRA system, while in the standby state, determining, by the TRA system, whether certain vehicle operating conditions are met by evaluating the vehicle dynamics data, when the certain operating conditions are met, processing, by the TRA system, an image from the at least one camera to determine if a trailer is attached to the tow vehicle, when a trailer is determined to be attached to the tow vehicle, determining, by the TRA system, whether parameters and/or image features of the attached trailer were learned previously, if the parameters and/or image features of the attached trailer were learned previously, identifying, by the TRA system, the attached trailer as a known trailer, and informing the driver that the TRA system can be activated, and if the parameters and/or features of the attached trailer were not learned previously, learning, by the TRA system, parameters and/or image features of the attached trailer, identifying the learned attached trailer as a new trailer, and informing the driver that the TRA system can be activated.

2. The method of claim 1, wherein informing the driver includes using one of the display, an instrument cluster of the vehicle, indicator lights, and sound, and wherein the method further comprises, after informing the driver that the TRA system can be activated and with the vehicle in Park:

activating the TRA system to operate in an active state, determining, by the TRA system, if the trailer is a known trailer, if the trailer is a known trailer, initiating the TRA system with the learned parameters and/or image features of the known trailer, prompting the driver to place the vehicle in Reverse, with the aid of the TRA system, reversing the vehicle and thus the attached known trailer.

3. The method of claim 1, wherein the parameters and/or image features comprise at least one of an image of the trailer, a marking on the trailer, type of trailer, and trailer wheel base length.

4. The method of claim 1, further comprising, when the parameters and/or image features of the attached trailer were learned previously, further learning and refining, by the TRA system, the parameters and/or image features of the known trailer, and updating a memory circuit of the TRA system containing the parameters and/or image features of the known trailer.

5. The method of claim 1, further comprising, after learning the parameters and/or image features of the new trailer, storing the learned parameters and/or image features in a memory circuit of the TRA system.

6. The method of claim 1, wherein the steps of determining whether certain vehicle operating conditions are met; processing the image; determining whether parameters and/or image features of the attached trailer were learned previously; and learning the parameters and/or image features of the attached trailer are performed by a processor circuit of the TRA system.

7. The method of claim 1, wherein the step of whether the parameters and/or image features of the attached trailer were learned previously includes comparing presently obtained parameters and/or image features of the attached trailer with stored parameters and/or image features of the various trailers.

8. The method of claim 1, wherein the step of informing the driver that the TRA system can be activated includes notifying the driver by the TRA system using a telltale or a HMI message.

9. The method of claim 1, wherein step of determining whether certain vehicle operating conditions are met includes determining, by the TRA system, if the vehicle is in Drive and is driving in a forward direction with a speed greater than a threshold speed.

10. A trailer reverse assist (TRA) system for a tow vehicle to aid in reversing an attached trailer, the TRA system comprising:
a processor circuit,
at least one camera constructed and arranged to obtain images of the trailer, and
vehicle dynamic sensors constructed and arranged to obtain vehicle dynamics data from the vehicle,
wherein the processor circuit is constructed and arranged, while the TRA system is in a standby, non-active state and while the vehicle is in Drive and traveling forward at a speed above a threshold speed, to:
learn parameters and/or image features of an attached trailer based on data from the at least one camera and the vehicle dynamic sensors,
cause the learned parameters and/or image features of the attached trailer to be stored in a database, and
inform the driver that the TRA system can be activated, and
wherein the processor circuit is constructed and arranged, while the TRA system is in an active state and while the vehicle is in Reverse, to:
determine if stored parameters and/or image features of the attached trailer are available and if so, initiate the TRA system with the stored parameters and/or image features data of the attached trailer, and
control the TRA system to aid in reversing the vehicle with the attached trailer;
wherein the processor circuit is further constructed and arranged, while the TRA system is in the active state and the vehicle is in Reverse, to determine if stored parameters and/or image features of an attached second trailer, different from the first trailer, are available and if not, inform the driver that the attached second trailer needs to be calibrated while the TRA system is in the standby, non-active state before the TRA system can be activated in the active state, calibration of the attached second trailer comprising learning parameters and/or image features of the attached second trailer.

11. The TRA system of claim 10, further comprising a memory circuit containing the database.

12. The TRA system of claim 10, wherein the learned parameters and/or image features include at least one of an image of the trailer, a marking on the trailer, type of trailer, and trailer wheel base length.

13. The TRA system of clam 10, further comprising a steering module constructed and arranged to send signals to a steering system of the vehicle.

14. The TRA system of claim 10, wherein in the vehicle has a display or an indicator, and wherein the processor circuit is constructed and arranged to inform the driver that the TRA system can be activated by sending a signal to the display or indicator.

15. The TRA system of claim 10, wherein the TRA system enters the active state following receipt of a driver-activated signal while the tow vehicle is in Park.

16. The method of claim 1, further the TRA system enters the active state following receipt of a driver-activated signal while the tow vehicle is in Park.

* * * * *